(12) United States Patent
Hasson et al.

(10) Patent No.: US 8,756,161 B2
(45) Date of Patent: *Jun. 17, 2014

(54) CUSTOMER INITIATED PAYMENT METHOD USING MOBILE DEVICE

(75) Inventors: Robert Hasson, Antibes (FR);
Emmanuel Viale, Cagnes sur Mer (FR);
Jeremy Light, London (GB)

(73) Assignee: Accenture Global Services Limited, Dublin (IE)

( * ) Notice: Subject to any disclaimer, the term of this patent is extended or adjusted under 35 U.S.C. 154(b) by 414 days.

This patent is subject to a terminal disclaimer.

(21) Appl. No.: 12/368,407

(22) Filed: Feb. 10, 2009

(65) Prior Publication Data

US 2009/0240626 A1 Sep. 24, 2009

(30) Foreign Application Priority Data

Feb. 11, 2008 (EP) .................................... 08300082
Jul. 7, 2008 (EP) .................................... 08305383

(51) Int. Cl.
*G06Q 20/00* (2012.01)
*G06Q 20/12* (2012.01)
*G06Q 20/02* (2012.01)
*G06Q 20/08* (2012.01)
*G06Q 20/40* (2012.01)
*G06Q 30/00* (2012.01)

(52) U.S. Cl.
CPC .............. *G06Q 20/12* (2013.01); *G06Q 20/027* (2013.01); *G06Q 20/0855* (2013.01); *G06Q 20/085* (2013.01); *G06Q 20/401* (2013.01); *G06Q 30/00* (2013.01)
USPC ................... 705/68; 705/77; 705/78; 705/79

(58) Field of Classification Search
CPC ... G06Q 30/00; G06Q 20/401; G06Q 20/085; G06Q 20/0855; G06Q 20/027; G06Q 20/12
USPC ................................................. 705/68, 77–79
See application file for complete search history.

(56) References Cited

U.S. PATENT DOCUMENTS 5,594,228 A * 1/1997 Swartz et al. .................. 235/383
6,726,094 B1 4/2004 Rantze et al.
(Continued)

FOREIGN PATENT DOCUMENTS

WO 03046784 A 6/2003
WO 2004105359 A 12/2004
(Continued)

OTHER PUBLICATIONS

"Global Credit Authorization Guide v3.2". Aug. 11, 2006. All pages. http://www.ncosc.net/SECP/Exhibit1-AmericanExpressGlobalCreditAuthorizationGuide.pdf.*

(Continued)

*Primary Examiner* — Calvin Cheung
(74) *Attorney, Agent, or Firm* — Harrity & Harrity, LLP

(57) ABSTRACT

The invention concerns a method of making a payment transaction by a customer including steps of receiving, by a mobile device (402) of the customer, merchant data; transmitting, by the mobile device to a remote server (408), a payment transaction request including the merchant data; determining, by the remote server, the identity of the customer based on the request and the identity of the merchant based on the data; and implementing the payment transaction between bank accounts of the customer and the merchant.

20 Claims, 4 Drawing Sheets

(56) References Cited

U.S. PATENT DOCUMENTS

| | | | |
|---|---|---|---|
| 7,040,533 B1* | 5/2006 | Ramachandran | 235/379 |
| 7,431,208 B2* | 10/2008 | Feldman et al. | 235/380 |
| 2002/0042766 A1 | 4/2002 | Walker et al. | |
| 2002/0046185 A1 | 4/2002 | Villart et al. | |
| 2002/0128912 A1* | 9/2002 | Vindeby | 705/16 |
| 2002/0143634 A1 | 10/2002 | Kumar et al. | |
| 2002/0156696 A1* | 10/2002 | Teicher | 705/26 |
| 2003/0014327 A1* | 1/2003 | Skantze | 705/26 |
| 2004/0195314 A1 | 10/2004 | Lee | |
| 2004/0215963 A1 | 10/2004 | Kaplan | |
| 2005/0003839 A1* | 1/2005 | Tripp | 455/466 |
| 2005/0035208 A1 | 2/2005 | Elliot et al. | |
| 2005/0203854 A1* | 9/2005 | Das et al. | 705/64 |
| 2005/0222961 A1* | 10/2005 | Staib et al. | 705/64 |
| 2006/0129485 A1 | 6/2006 | Hamzy et al. | |
| 2006/0258397 A1* | 11/2006 | Kaplan et al. | 455/556.1 |
| 2006/0294025 A1* | 12/2006 | Mengerink | 705/77 |
| 2007/0090197 A1* | 4/2007 | Senda | 235/494 |
| 2007/0174198 A1* | 7/2007 | Kasahara et al. | 705/51 |
| 2007/0192206 A1* | 8/2007 | Manesh et al. | 705/26 |
| 2007/0215687 A1* | 9/2007 | Waltman | 235/379 |
| 2007/0233615 A1* | 10/2007 | Tumminaro | 705/75 |
| 2008/0048044 A1* | 2/2008 | Zhao et al. | 235/494 |
| 2008/0167988 A1* | 7/2008 | Sun et al. | 705/39 |
| 2008/0208762 A1* | 8/2008 | Arthur et al. | 705/79 |
| 2008/0242274 A1* | 10/2008 | Swanburg et al. | 455/414.1 |
| 2008/0301585 A1* | 12/2008 | Murray et al. | 715/839 |
| 2009/0006181 A1* | 1/2009 | Ghosh et al. | 705/10 |
| 2009/0070228 A1* | 3/2009 | Ronen | 705/26 |
| 2009/0088203 A1* | 4/2009 | Havens et al. | 455/556.1 |
| 2009/0234773 A1 | 9/2009 | Hasson | |
| 2009/0248538 A1* | 10/2009 | Taylor | 705/26 |
| 2010/0211491 A1* | 8/2010 | Kagan et al. | 705/34 |
| 2011/0137742 A1* | 6/2011 | Parikh | 705/26.1 |
| 2012/0109826 A1* | 5/2012 | Kobres | 705/64 |
| 2012/0310826 A1* | 12/2012 | Chatterjee | 705/41 |

FOREIGN PATENT DOCUMENTS

| | | |
|---|---|---|
| WO | 2005001670 A | 1/2005 |
| WO | 2005036485 A | 4/2005 |
| WO | 2006095212 A | 9/2006 |

OTHER PUBLICATIONS

"Real-Time Video Communications for GPRS", Simon N. Fabri, Stewart Worrall, Abdul Sadka and Ahmet Kondoz, First International Conference on 3G Mobile Communiction Technologies—Conference Publication No. 471, Mar. 27, 2000, pp. 426-430, London UK.

European Search Report for EP Patent Appication 08 30 0082 issued on Jul. 31, 2008.

European Search Report for Application EP 08 30 0081 issued Jul. 25, 2008.

Broadcom Analyst Meeting—Final, Fair Disclosure Wire, Waltham, Dec. 8, 2008.

* cited by examiner

CUSTOMER INITIATED PAYMENT METHOD USING MOBILE DEVICE

CROSS-REFERENCE TO RELATED APPLICATION

The instant application is related to co-pending U.S. Patent Application No. 12/368,387entitled "Point Of Sale Payment Method" and filed on even date herewith.

FIELD OF THE INVENTION

The present invention relates to a system and method for making a payment by a customer, and in particular to a customer initiated payment system and method using a mobile device.

BACKGROUND TO THE INVENTION

FIG. 1 illustrates schematically a payment method often used for making payments by payment card, such as a credit or debit card.

The payment card 102 is a smart card having a built-in chip 103, and is presented by a customer at a point of sale. The card is placed in a chip reader 104, which reads the chip and requests that the customer types his/her PIN (personal identification number). The correct PIN is stored on the electronic chip 103 and thus the chip reader 104 is able to immediately verify whether the PIN has been correctly entered. The card details and transaction details are then transmitted to a credit card clearing house (CCCH) 106, for example via a telephone line, and the credit card clearing house settles both the customer's account and the merchant's account, by transferring money from customer's bank 108 to the merchant's bank 110.

One drawback of this method for payment is that by handing over a payment card, which is inserted into the merchant's card reader at the point of sale, the customer risks having personal details such as the payment card number, expiry date, and importantly the PIN, stolen. In particular, there is a risk that the vendor's card reader has been tampered with, allowing the payment card to be cloned, and the PIN copied when entered by the customer. Furthermore, it is often only necessary for a fraudster to obtain the card number in order to make a fraudulent transaction, making even handing over a payment card risky for a customer.

Additionally, where vendors retain card or bank account information, for example for making repeat orders, there is a risk to the customer that this personal information is stolen by fraudsters.

SUMMARY OF THE INVENTION

One aim of the present invention is to at least partially address one or more drawbacks in the prior art.

According to one aspect of the present invention, there is provided a method of making a payment transaction by a customer comprising: receiving, by a mobile device of the customer, merchant data; transmitting, by the mobile device to a remote server, a payment transaction request comprising the merchant data; determining, by the remote server, the identity of the customer based on the request and the identity of the merchant based on the data; and implementing the payment transaction between bank accounts of the customer and the merchant.

According to one embodiment of the present invention, the method further comprises transmitting a personal identification number (PIN) entered by the customer to the remote server, and verifying the PIN by the remote server.

According to another embodiment of the present invention, the method further comprises transmitting a confirmation message by the remote server to the mobile device after implementing the payment transaction.

According to another embodiment of the present invention, the merchant data comprises at least one image of a visual token captured by a camera of the mobile device, the visual token comprising encoded data identifying the merchant.

According to another embodiment of the present invention, the method comprises, prior to receiving the merchant data by the mobile device, producing the visual token, wherein the visual data further encodes transaction details relating to the payment transaction.

According to another embodiment of the present invention, the step of transmitting the merchant data to the remote server comprises establishing a video call between the mobile device and the remote server, wherein images of the visual token are captured by the camera of the mobile device and transmitted to the remote server as part of the video call.

According to another embodiment of the present invention, the merchant data is transmitted by point of sale equipment to be received by the mobile device.

According to another embodiment of the present invention, the merchant data is transmitted from the point of sale equipment to the mobile device using near field communications.

According to another embodiment of the present invention, the mobile device is selected as the mode of payment for the payment transaction by positioning the mobile device within communication range of the point of sale equipment.

According to another embodiment of the present invention, the method further comprises generating by the point of sale equipment a transaction ID associated with said payment; transmitting said transaction ID to said remote server; and transmitting by said remote server said transaction ID to said point of sale equipment to confirm that the payment has been implemented.

According to another embodiment of the present invention, the method further comprises encrypting said transaction ID by said remote server, said transaction ID transmitted from the remote server to the point of sale equipment being the encrypted transaction ID, and decrypting by the point of sale equipment the transaction ID.

According to another embodiment of the present invention, identity of the customer is determined based on a caller identification of the mobile device received by the server upon reception of payment transaction request.

According to another aspect of the present invention, there is provided a system arranged to make a payment transaction by a customer at a point of sale comprising: a mobile device of the customer arranged to receive merchant data; and a remote server arranged to receive from the mobile device a payment transaction request comprising the merchant data, to determine the identity of the customer based on the request and the identity of the merchant based on the data, and to implement the payment transaction between bank accounts of the customer and the merchant.

According to an embodiment of the present invention, the remote server comprises a memory arranged to store merchant account details associated with the merchant data and customer account details.

According to yet another aspect of the present invention, there is provided a server arranged to make a payment transaction between a customer account and a merchant account, comprising: an input interface arranged to receive from a mobile device of the customer a payment transaction request comprising merchant data of the merchant; a memory arranged to store merchant account details associated with merchant data and to store customer account details; and circuitry arranged to determine the identity of the customer based on the payment transaction request and to select the account details associated with the merchant data and customer account details associated with the customer for use in making the payment transaction.

According to some embodiments of the present invention the payment transaction is made at a point of sale.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION OF THE EMBODIMENTS OF THE PRESENT INVENTION

Figure 2:
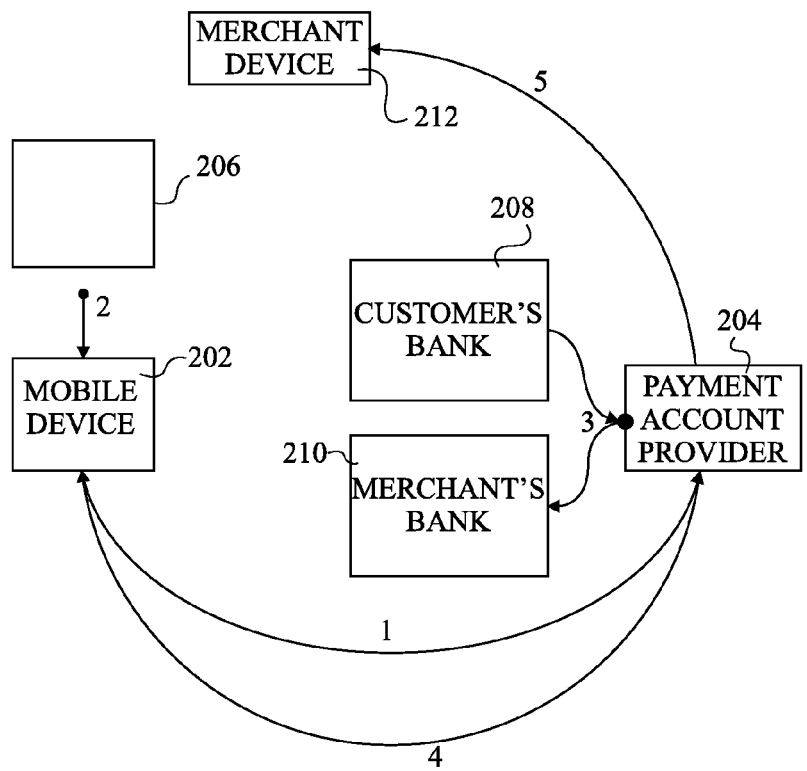
FIG. 2 illustrates steps in a customer initiated payment method according to an embodiment of the present invention.

FIG. 2 illustrates a customer initiated payment method in which the customer makes a payment to a merchant using his/her mobile device 202. Mobile device 202 is for example a mobile telephone, pocket super computer, or other portable communications device, which could be a PDA (personal digital assistant), a music or media player, a games console etc. with WiFi (wireless fidelity), Bluetooth capabilities or another communications capability.

The customer's mobile device 202 is registered with a payment account provider 204, such that when a call is made to payment account provider 204 from the customer's mobile device 202, the customer is identified by the payment account provider using caller ID or the like. Payment account provider 204 also stores registered details of the client's payment method, for example payment card details and/or bank account details, allowing payment account provider 204 to execute a payment from the customer to a third party. The payment account provider is an entity that can take money from a customer's bank account, credit card or other account, and also access the merchant's account to pay funds, for example through a clearing house, such as an ACH (automated clearing house), credit card clearing house (CCCH), or by direct bilateral agreement.

The merchant is preferably enrolled via the payment account provider 204 in a visual payment system, whereby the merchant is provided with a unique visual token 206, which is for example a 2-dimensional barcode, or text indicating the merchant's name, number, picture or the like, and could be provided on a card, screen or printed on a piece of paper. The payment account provider 204 for example comprises a memory electronically storing images of visual tokens along with the associated bank details of the merchant.

Figure 1:
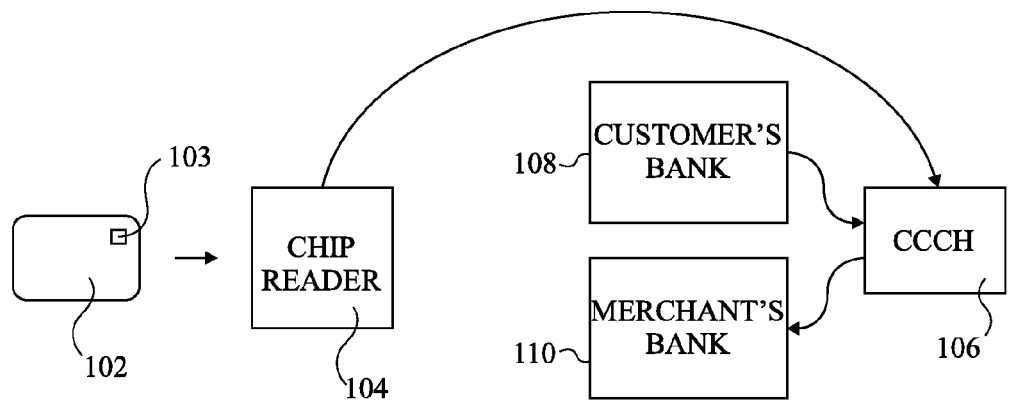
FIG. 1 (described above) illustrates a known customer payment method.

When a customer wishes to make a payment to a merchant, as a first step, at the point of sale, the customer calls the payment account provider 204 using mobile device 202, as shown by arrow 1 in FIG. 1. The telephone call could be a voice call, or in some embodiments, a video call, for example using a 3G mobile network or the like. The customer enters the amount of the transaction, for example through an automatic voice response (AVR) menu, implemented for example by a server in the payment account provider 204. For example, the customer dictates the transaction details, or types them on the keypad of his mobile device. The transaction details include the total amount of money to be transferred by the transaction, and could include further information, such as the transaction date, if the transaction is not to be executed immediately, and/or the transaction currency.

The payment account provider 204 then requests that the customer provides an image of the merchant's visual token 206. For example, in some embodiments, a voice instruction is provided by the integrated voice response unit (AVRU) implemented by the server in the payment account provider 204 for the customer to capture images of the visual token 206, or in the case of a video call, visual instruction could be transmitted to the display of the mobile device 202 by the server.

The customer then films the merchant's visual token 206 using the camera on the device, as shown by arrow 2 in FIG. 2. For this, mobile device 202 comprises an in-built digital camera, enabling images to be captured.

Next, one or more images are transmitted to the payment account provider 204. For example, if the call is initiated as a video call, images can be transmitted to the payment account provider 204 as part of the video call, and feedback can be provided within the video call by the payment account provider to indicate when the merchant's visual token 206 has been recognized and the merchant identified. So that the customer can be sure that the correct merchant has been identified, the name of the merchant could be transmitted to the display of the mobile device 202. Alternatively, if the call is initiated as a voice call, one or more images could be captured of the visual token 206, and transmitted to the payment account provider 204, for example via a media message or the like. Confirmation of the merchant could then also be sent via SMS (short message service) text message or media message.

In some embodiments, for security reasons, the payment account provider 204 may request a PIN from the customer. In such embodiments, the PIN is registered with the payment account provider 204, such that the payment account provider 204 can verify that the PIN is correctly entered. The PIN request could be in the form of a visual message on the display of the mobile device requesting that the PIN be entered, or a voice request. The PIN is for example entered during a call with the server of the payment account provider, and when the call is managed by an interactive voice response system in the server, the customer for example types the PIN using the keypad of the mobile device. Alternatively, in some embodiments a random portion of the PIN could be requested and the relevant characters of the PIN dictated by the customer, and voice recognition in the server of the payment account provider used to recognise the PIN.

The payment account provider 204 may then proceed to perform the required payment transaction. In particular, the payment account provider 204 settles both accounts, by transferring the sum from the customer's bank to the merchant's bank, or billing the customer and paying the merchant the balance, as represented by arrow 3 in FIG. 2.

As illustrated by arrows 4 and 5 in FIG. 2, a confirmation message can then be transmitted to mobile device 202, and if the merchant has registered a telephone number or other contact details with the payment account provider 204, to a merchant's mobile telephone or message receiving device 212. This allows the merchant to confirm that the payment has been made, and to allow the customer to leave with the purchases. In some embodiments, the merchant's point of sale equipment receives the confirmation message, allowing payment confirmation of the sale to be registered.

In alternative embodiments, rather than the merchant using the same visual token 206 for each payment transaction, the merchant could produce a visual token 206 for each payment transaction. For example, a visual token could be printed, or presented on an LCD (liquid crystal display) or alternative display. In this case the token can encode additional information such as the details of the payment transaction, including the total cost of the transaction. The token could comprise a 2-D barcode or the like, or the typed transaction details, printed or displayed on a screen. In the latter case, the payment account provider 204 for example uses optical character recognition of the image transmitted by the mobile device 202 to determine the transaction details. The visual token 206 can be generated, for example by point of sale equipment of the merchant, and this means that the customer no longer needs to provide the transaction details.

In alternative embodiments, rather than taking place in a merchant's store, the sale is made via an internet post, such as a home PC, laptop or other machine allowing internet access. In such embodiments the customer purchases items via the merchant's internet site. In this case, the visual token 206 could be displayed on a web page of the merchant site, and the customer could capture the token by filming or photographing the display screen of the internet post, or printing the token on a printer and filming or photographing the printed version. The same visual token could be provided by the merchant for all customers and all purchases, or unique visual tokens could be provided for each customer and/or purchase, for example generated by a remote server associated with the merchant.

Figure 3A:
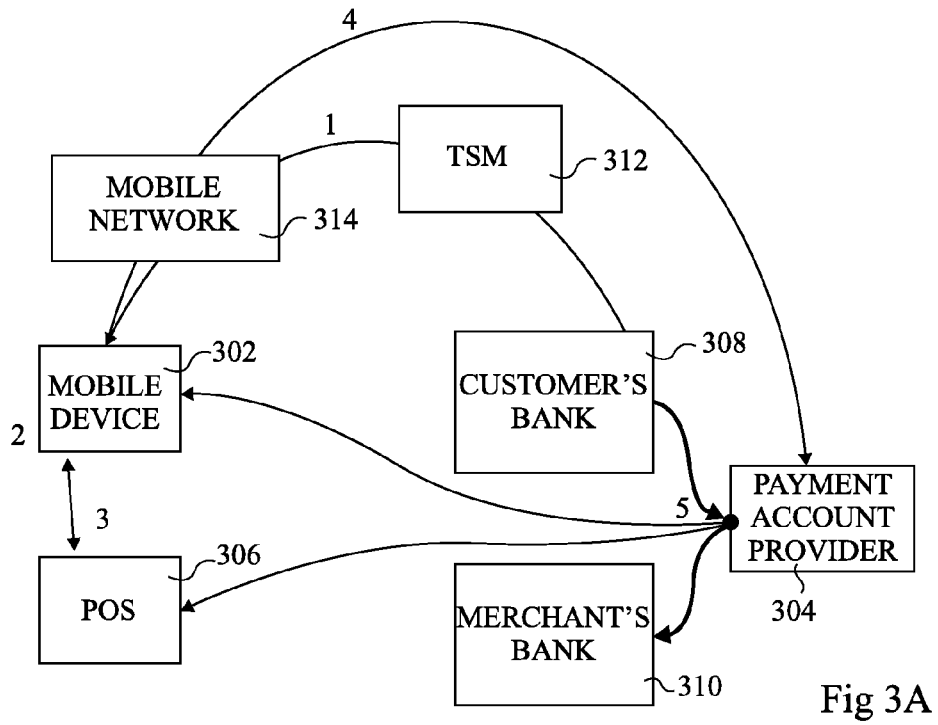
FIGS. 3A, 3B and 3C illustrate steps in alternative customer initiated payment methods according to embodiments of the present invention.

FIG. 3A illustrates an alternative embodiment, in which again a customer's mobile device 302 is used to make a payment. Mobile device 302 is equipped with a communications interface for communicating with point of sale equipment 306. For example, the mobile device is equipped with short-range communication technology, such as near field communications hardware, or Bluetooth hardware, allowing radio frequency (RF) communication with an interface of the point of sale equipment 306. Alternatively, other technologies could be used, such as infrared.

Whereas in the previous embodiment the merchant is identified by an image of a visual token captured and transmitted by the customer's mobile device, in this embodiment the point of sale equipment 306 electronically provides identification details to the mobile device 302 that can be forwarded to the payment account provider 304. For example, the details could include, in text format or encoded format, the name of the merchant, the total transaction amount, and may include other details such as the date and currency of the transaction.

Again, the customer's mobile device is known to the payment account provider 304. Furthermore, the mobile device 302 has for example been loaded with a payment application, which provides functionality on the mobile device for automatically managing transmission of information needed to make the payment, and allowing an interface with the customer. In one embodiment, prior to initiating a transaction, the Trusted Service Manager (TSM) 312 associated with the mobile telecommunications network 314 of the mobile device 302 and/or with the customer's bank provides a payment application, such as a credit card application, to the mobile device 302 via mobile network 306, as shown by arrow 1 in FIG. 3A. Alternatively, such an application could be loaded onto the phone from elsewhere.

When the customer is ready to pay for purchases in a store of a merchant or at an internet post while viewing the website of a merchant, the customer indicates that they wish to make the payment using their mobile device 302, and point of sale equipment 306 is activated. The point of sale equipment could be circuitry provided near the cash register in a merchant's store, or it could be the internet post used by the customer to access the merchant's website. The point of sales equipment 306 comprises a communications interface allowing communication with the mobile device 302. For example, it may comprise a Bluetooth interface, or other near-field communications interface, or other interface for communicating with mobile device 306.

A payment instrument is selected and negotiated between the POS equipment 306 and the mobile device 302 as shown by arrow 2 in FIG. 3A. This involves the mobile device 302 being confirmed in the POS equipment 306 as being the payment mechanism. In particular, when the merchant payment system requests to know the mode of payment, "mobile payment" can be selected, triggering connection with the mobile device 302 to transmit the merchant and transaction details.

The mobile device 302 is placed within range of the POS equipment 306 such that the transmission can be effected. Preferably, the range of the point of sale equipment 306 is relatively short, ensuring that only mobile device 302 is found, and not other mobile devices present in the vicinity. In some embodiments, rather than the merchant or customer telling the POS equipment 306 that payment is to be made by mobile device, just placing the mobile device in range of the POS equipment 306 indicates the intention of the customer to pay by mobile device. In this case, communication between the POS equipment 306 and mobile device 302 starts automatically.

There may be a number of different payment instruments that can be used by the mobile device 302 to make a payment transaction. In particular, it may be a real time, same day, overnight, or other time period bank account credit transfer or direct debit, or the customer may have a VISA card, an American Express Card and VISA Delta card, all registered with the payment account provider 306, or with different credit card clearing houses. In this case, the POS equipment 306 and mobile device 302 for example communicate to determine which payment instruments are possible for making the payment transaction. In the case that it is determined that more than one payment instrument is possible, for example a VISA payment and Visa delta payment, this could trigger mobile device to request, for example via its display, that the customer indicate the payment method they wish to use. Alternatively, the customer may have configured in a memory of the mobile device 306 an order of preference for payment instruments, in which case the highest acceptable payment instrument can be used.

The POS equipment 306 then transmits the details of the merchant, along with details of the transaction, to the mobile device 302, as shown by arrow 3 in FIG. 3A. Alternatively or additionally, transmission of the merchant/transaction details could require the customer to accept them via the keypad on the mobile device 302. As discussed above, the transmission could be implemented using near field communications hardware, or Bluetooth, or other technology.

The payment application installed on the mobile device 302 then preferably requests that the customer enters a PIN to confirm that it is indeed the registered customer that is trying to make the purchase, and not somebody who has stolen the customer's mobile device. The merchant details, transaction details, and PIN are then sent to the payment account provider 304 as shown by arrow 4 in FIG. 3A. Transmission is for example by text message, or media message, or within a mobile telephone call between mobile device 302 and payment account provider 304, during which the information is automatically transmitted via an AVRU. As a further alternative, transmission may be via a proprietary data exchange between the mobile payment application and the payment account provider 304.

The payment account provider 304 is then able to complete the payment transaction, by transferring money from the customer's bank 308 to the merchant's bank 310.

In alternative embodiments, the purchase could be made via the merchant's website viewed via the mobile device itself. In this case, the point of sale equipment 306 could be remote circuitry, such as a server or the like, associated with the merchant. Communication between the point of sale equipment 306 and the mobile device could then be for example via the mobile network of the mobile device 302.

Figure 3B:
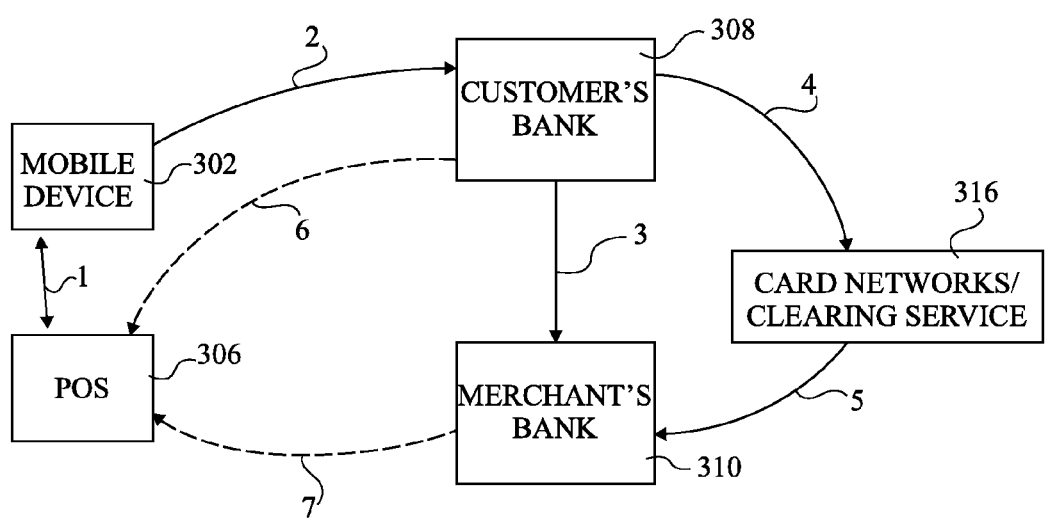

FIG. 3B illustrates an alternative embodiment in which mobile device 302 is again used to make a payment. Like elements of FIG. 3A have been labelled with like reference numerals, and will not be described again in detail.

As with the embodiment of FIG. 3A, mobile device 302 is equipped with a communications interface for communicating with the POS equipment 306, for example via the mobile telephone network associated with the mobile device 302, or via wireless short range communications technology, such as near field communications hardware or Bluetooth hardware. Alternatively, other technologies could be used, such as infrared.

As with the embodiment of FIG. 3A, the mobile device 202 has for example been loaded with a payment application, and this step will not be described again in detail.

In the same way as described above in relation to FIG. 3A, when the customer is ready to pay for purchases in a store of a merchant or via an internet site of a merchant, the customer indicates that they wish to make the payment using their mobile device 302, and the point of sale equipment 306 is activated. A payment instrument is selected and negotiated between the POS equipment 306 and the mobile device 302 as shown by arrow 1 in FIG. 3B. The merchant also electronically provides, via the POS equipment 306, identification details to the mobile device 302. For example, the details could include, in text format or encoded format, the name of the merchant, the total transaction amount, and may include other details such as the date and currency of the transaction. In this embodiment, the POS equipment 306 also generates and transmits a transaction ID to the mobile device 302. The transaction ID is for example a 64 or 128-bit number uniquely generated for each transaction.

The payment application installed on the mobile device 302 then preferably requests that the customer enters a PIN. The merchant details, transaction details, transaction ID and PIN are then sent to the customer's bank 308 as shown by arrow 2 in FIG. 3B. Transmission is for example by text message, or media message, or within a mobile telephone call between mobile device 308 and a server of the bank 308, during which the information is automatically transmitted via an AVRU. As a further alternative, transmission may be via a proprietary data exchange between the mobile payment application and a server in the bank 308.

The customer's bank receives the merchant details, transaction details, transaction ID and PIN. The bank recognises the customer, for example based on the caller ID of the mobile telephone. The bank also checks that the PIN is correct, for example based on a PIN stored in its records. The customer's bank also identifies the merchant's bank 310, based on the merchant identifier, and initiates the credit transfer, either directly to the merchant's bank 310 as shown by arrow 3, or via a card network or clearing service 316. A card network provides access to a credit card clearing service to clear card payments between the acquiring and issuing banks. A clearing service more generally allows all types of payments to be cleared, including electronic payment transfers and direct debits, which can be cleared by an automated clearing house, with or without card payment clearing capabilities.

The seller is then notified that the payment has been initiated/accepted. Such a notification could be sent by the customer's bank 308 to the POS equipment 306, as indicated by dashed arrow 6. In this case, the notification for example comprises the transaction ID encoded using encryption techniques, for example based on a secret key known by POS 306, and transmitted to the mobile device 302, which forwards the encrypted transaction ID to the POS equipment 306. The POS equipment 306 then for example decodes the transaction ID, and verifies that it corresponds to the transaction ID initially transmitted, before indicating, for example on a display screen, that the payment is accepted and that the goods can be released. Alternatively, the notification could be sent from the merchant's bank to the POS equipment 306. In this case, when the payment is initiated by the customer's bank to the merchant's bank, the transaction ID is for example used as the payment reference, and then, as shown by arrow 7, the transaction ID is transmitted to the POS equipment 306 as the notification. The POS equipment 306 then checks the transaction ID received from the merchant's bank with the initially generated transaction ID, and if they match, the goods can be released to the customer. If they do not match, this could suggest an attempted fraud, and the merchant should investigate further before releasing the goods.

Figure 3C:
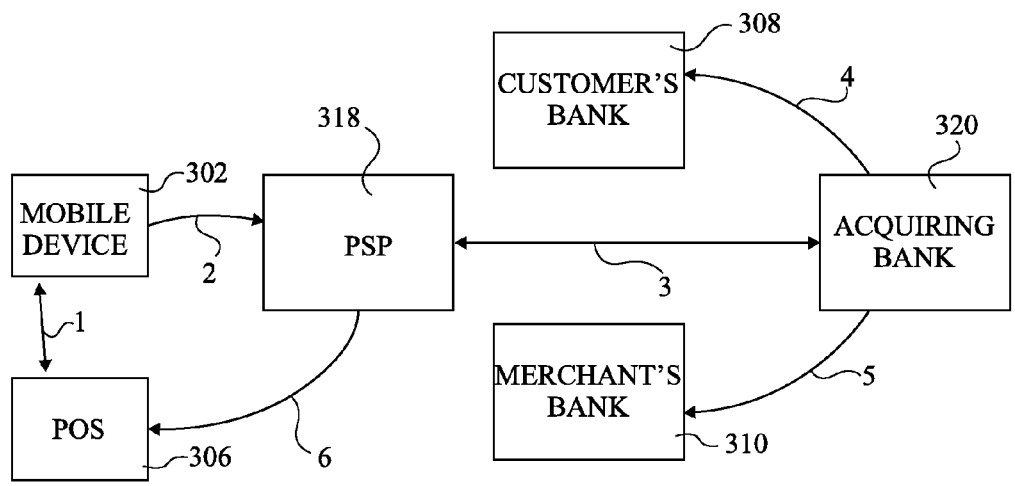

FIG. 3C illustrates an alternative embodiment in which the mobile device 302 is used to make a payment in the same way as described above in relation to FIGS. 3B, except that in this case the merchant details, transaction details, transaction ID and user's PIN are transmitted to a payments service provider (PSP) 318. The PSP 318 is for example a server provided by the mobile telephone network associated with the mobile device 302, and supports payments using mobile device 302 and other mobile devices in the network. Alternatively, PSP 318 could be a third party with payment processing capabilities.

The PSP 318 receives the merchant details, transaction detail, transaction ID and PIN. The PSP recognises the customer, for example based on caller ID of the mobile telephone. The PSP also checks that the PIN is correct, for example based on a PIN stored in its records. The PSP 318 then initiates the credit transfer, via an acquiring bank 320, as indicated by arrow 3. The acquiring bank 320 initiates the credit transfer from the customer's bank 308 to the merchant's bank 310, as indicated by arrows 4 and 5. The acquiring bank then transmits an acknowledgement to the PSP 318.

The seller is then notified that the payment has been initiated/accepted. The seller is for example notified by a notification transmitted directly from PSP 318 to the POS 306, as illustrated by arrow 6. This notification for example comprises the transaction ID, and POS 306 checks that this corresponds to the transaction ID initially generated, and if so allows the purchased goods to be released to the customer.

Alternatively, the PSP 318 could encode the transaction ID, for example using a secret key known by the POS 306, and could transmit the encrypted transaction ID to the POS 306 via the mobile device 302. The POS 306 then decodes the transaction key and verifies it before indicating to sales staff that goods may be released to the customer.

Figure 4:
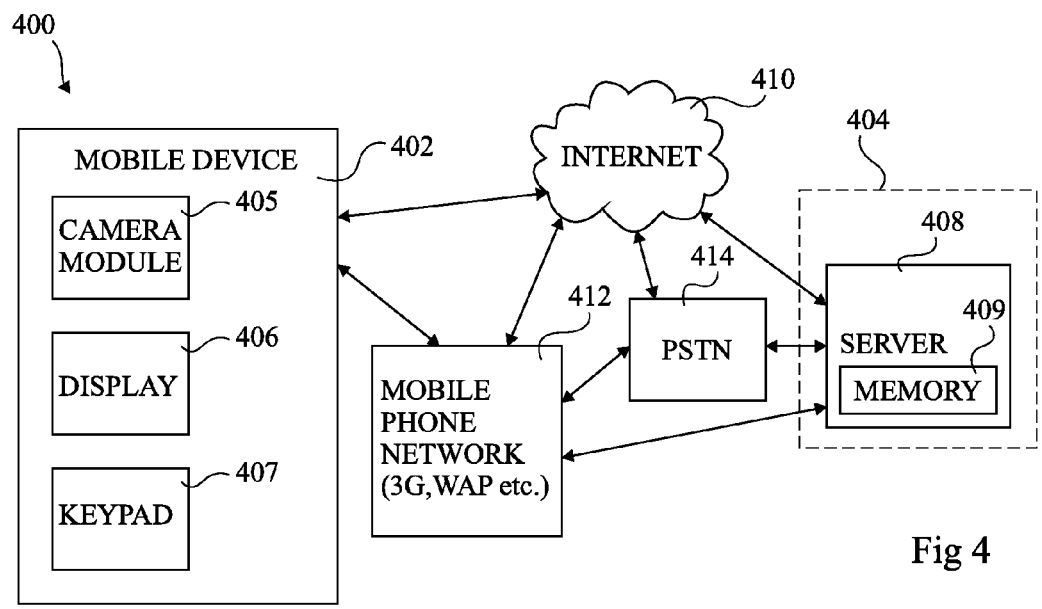
FIG. 4 illustrates a system for implementing the methods of FIGS. 2, 3A, 3B or 3C according to an embodiment of the present invention.

FIG. 4 illustrates the blocks of a system 400 for implementing the method of FIG. 2 or FIG. 3A, 3B or 3C. The mobile device 402 represents device 202 or 302 of FIGS. 2 and 3A-3C respectively, while the block 404 for example represents the payment account provider 204 or 304 of FIGS. 2 and 3A respectively, the customer's bank 308 of FIG. 3B, or the PSP 318 of FIG. 3C.

Mobile device 402 for example comprises a camera module 405, a display 406 and a keypad 407. It may also comprise further components not shown in FIG. 4, for example a base band processor, memory and battery.

Block 404 comprises a server 408 which is able to communicate with the mobile device 402. Server 408 is furthermore able to respond to voice and/or video calls, and in some embodiments implements an AVRU for responding to calls.

Server 408 comprises a memory 409 which for example stores account details relating to the customer, which are associated in the memory with the caller identification number of the customer such that when a customer calls, their account details can be extracted from the memory. Furthermore, in relation to the embodiment of FIG. 2, the memory 409 can store merchant account details associated with a merchant identifier, for example the name of the merchant, or, in the case of the embodiment of FIG. 2, a visual image corresponding to visual token of the merchant. The merchant details can then be determined by server 408 by comparing the merchant's visual token 206 transmitted by the customer's device with visual images in the database, and for example using object recognition to find a match.

In relation to the embodiments of FIGS. 3A to 3C, the memory 409 for example stores account details relating to the merchant and associated with the merchant details transmitted by the point of sale 306 to the customer's device, and received by the server 408. In particular, the merchant details could comprise a merchant identifier number, which is stored in the memory 409 in association with the merchant's account details.

As illustrated, the interfaces between the mobile device 402 and the server 408 for example include the Internet 410, a mobile telephone network 412 and the public switched telephone network (PSTN) 414. In particular, the mobile device 402 may have WLAN (wireless local area network) access, allowing the merchant to access the Internet, and contact server 408 via an encrypted connection over the Internet 410. Alternatively, the mobile device 402 may be connected to the Internet 410 via the mobile telephone network 412, for example using 3G or WAP (wireless application protocol), and may connect to the server via a secured encrypted connection via the mobile network 412 and the Internet 410. Alternatively, the server 408 may have a connection to the mobile network 412 directly, in which case the mobile device 402 could communicate to the server 408 directly via the mobile network 412, for example using 3G in the case of a 3G video call. As a further alternative, the server 408 may be accessed via the public switched telephone network (PSTN), illustrated by block 414, either via the mobile telephone network 412 or the Internet 410 accessible by the mobile device 402.

Figure 5:
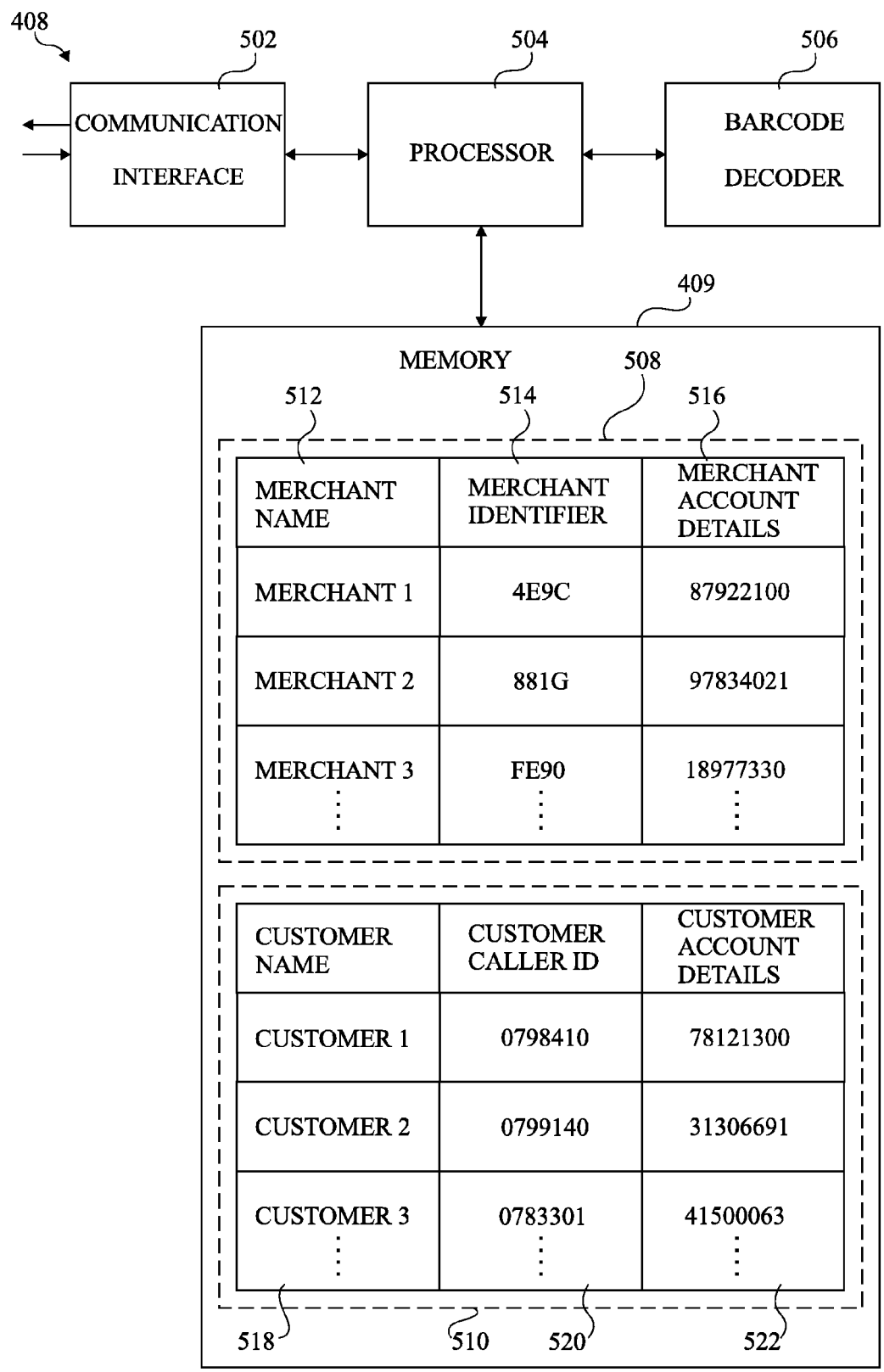
FIG. 5 illustrates the server of the system of FIG. 4 in more detail according to an embodiment of the present invention.

FIG. 5 illustrates the server 408 of FIG. 4 in more detail according to one embodiment.

As illustrated, a communication interface 502 is provided for communicating with the mobile device of the customer. Communication interface 502 for example comprises circuitry for connecting the server 408 to one or more of the interfaces illustrated in FIG. 4 allowing communication with the mobile device.

The communication interface 502 is connected to a processor 504, which is in turn connected to an optional barcode decoder 506. The barcode decoder 506 is provided in embodiments described in relation to FIG. 2 in which a visual token is captured by the mobile device, the visual token being a 2-D barcode. The barcode decoder decodes a merchant identifier and any other data encoded by the barcode.

The memory 409 is connected to processor 504, and comprises a merchant database 508, and a customer database 520. In this example, the merchant database comprises merchant names 512, each associated with a merchant identifier 514, and merchant account details 516. The customer database comprises customer names 518, each associated with a customer caller ID 520, which is for example the telephone number of the customer's mobile device, and customer account details 522.

The processor 504 executes the steps of the server described above in relation to FIGS. 2 and 3, for example providing an AVRU, accessing the memory 409 to extract account detail of the customer and merchant etc.

Thus, a method has been described wherein a mobile device is used by a customer to make a payment transaction, using either the camera of the mobile device to film a visual token and thereby allow a server of a credit card clearing house or the like to identify the merchant or a communications interface of the mobile device to receive details of the merchant transmitted by point of sale equipment of the merchant. The mobile device can then be used to make a secure connection to a remote server in order to provide the transaction details, and preferably provide a PIN to the server.

An advantage of the payment method described herein is that, by using a customer's mobile device to connect to a server of a payment account provider or the like via one of a number of possible connection means and make the payment, the payment can be made in a secure, cost effective and simple fashion. In particular, mobile telephones are affordable devices that are already in high circulation, making them readily available for this purpose. In some embodiments, connection to the server is via a video call. Mobile telephones increasingly have 3G capability or the like, allowing video calls to be made.

An advantage of providing a transaction ID generated by equipment of the merchant is that this number can be used by the customer's bank and/or the merchants bank or a payments service provider to confirm to the merchant when funds have been transferred. The merchant can then release the goods. Advantageously, in some embodiments, the customer's bank and/or merchant's bank or the PSP encrypts the transaction ID to prevent fraud.

In some embodiments, a PIN is entered using the customer's mobile device. This has the additional advantage of adding an extra level of security to the transaction. In particular, in the case that the customer's mobile device is stolen, the thief would also need the PIN in order to make a fraudulent transaction.

Whilst a number of particular embodiments have been described, it will be clear to those skilled in the art that there are many alternatives that may be applied. For example, while the invention has been described in the case of a payment by credit card via a payment account provider, it will be apparent to those skilled in the art that the payment could relate to any type of card payment, in which a card can be identified to identify the customer's bank account. Furthermore, the payment account provider could be any establishment that can receive and authenticate details of a transaction, and apply these by debiting the customer and crediting the merchant.

It will be clear that while the present invention has been described in relation to a purchase by a customer, the same method could also be applied to reimburse a customer, in which case the same acts could be performed, only the transaction details indicating that the money has to be credit to the customer's account, and debited from the merchant's bank. In this case, an encrypted PIN from the merchant could be provided to the payment account provider, for example via the customer's mobile device, to ensure that the merchant has agreed to the transaction.

While a few examples of connection interfaces between the merchant's mobile device and the payment account provider have been provided, other interfaces could be used, for example other types of mobile telephony standards for calls or internet connections.

It will be apparent to those skilled in the art that the features described herein in relation to the various embodiments could be combined in alternative embodiments in any combination.

The invention claimed is:

1. A method comprising:
receiving, by a mobile device of a customer, information associated with a transaction between the customer and a merchant;
transmitting, by said mobile device and to a remote server, a payment transaction request,
the payment transaction request including the information associated with the transaction between the customer and the merchant;
capturing, by the mobile device, an image of a token associated with the merchant;
transmitting, by the mobile device and to the remote server, the image of the token;
receiving, by the mobile device and based on the transmitted payment transaction request and the transmitted image of the token, information associated with processing the transaction from the remote server,
the transaction having been processed by the remote server; and
providing, by the mobile device and for presentation, the received information associated with processing the transaction.

2. The method of claim 1, further comprising:
transmitting a personal identification number (PIN) associated with the customer to the remote server,
the PIN being verified by the remote server.

3. The method of claim 1, where the received information includes a confirmation message.

4. The method of claim 1, where the token includes encoded data identifying the merchant.

5. The method of claim 1, where the token includes information associated with transaction details relating to the payment transaction.

6. The method of claim 1, further comprising:
establishing a video call with the remote server,
the payment transaction request and the image of the token being transmitted during the video call.

7. The method of claim 1, where, when receiving the information associated with a transaction between the customer and a merchant, the method includes:
receiving the information associated with a transaction between the customer and a merchant using near field communications.

8. The method of claim 1, further comprising:
transmitting customer identification information to the remote server,
the customer identification information being used to identify the customer.

9. A device comprising:
a memory to store instructions; and
a processor to execute the instructions to:
receive information associated with a transaction between a customer and a merchant;
transmit, to a remote server, a payment transaction request,
the payment transaction request including the information associated with the transaction between the customer and the merchant;
capture an image of a token associated with the merchant;
transmit, to the remote server, the image of the token;
receive, based on the transmitted payment transaction request and the transmitted image of the token, information associated with processing the transaction from the remote server,
the transaction having been processed by the remote server; and
provide, for presentation, the received information associated with processing the transaction.

10. The device of claim 9, where the token includes encoded data identifying the merchant.

11. The device of claim 9, where the token includes information associated with transaction details relating to the payment transaction.

12. The device of claim 9, where the token includes information used by the remote server to process the transaction.

13. The device of claim 9, where the token includes a barcode.

14. The device of claim 9, where the processor is further to:
establish a video call with the remote server,
the payment transaction request and the image of the token being transmitted during the video call.

15. A device comprising:
a memory to store instructions; and
a processor to execute the instructions to:
receive, from another device, a payment transaction request,
the payment transaction request including information associated with a transaction between a customer and a merchant;
receive, from the other device, an image of a token associated with the merchant;
process, using the received payment transaction request and the received image of the token captured by the other device, the transaction; and
transmit, based on processing the transaction and to the other device, information associated with processing the transaction.

16. The device of claim 15, where
when receiving the payment transaction request, the processor is further to:
receive the payment transaction request during a video call established with the other device, and
when receiving the image of the token, the processor is further to:
receive the image of the token during the video call.

17. The device of claim 15, where the token includes encoded data identifying the merchant.

18. The device of claim 15, where the token includes information associated with transaction details relating to the payment transaction.

19. The device of claim 15, where the token includes a barcode.

20. The device of claim 15, where the processor is further to:
   receive a personal identification number (PIN) associated with the customer; and
   verify, using the PIN, the customer.

\* \* \* \* \*